(12) United States Patent
Lee

(10) Patent No.: US 9,690,440 B2
(45) Date of Patent: Jun. 27, 2017

(54) TOUCH SCREEN PANEL

(71) Applicant: Samsung Electronics Co., Ltd., Suwon-si, Gyeonggi-do (KR)

(72) Inventor: Heon-Seok Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 14/703,217

(22) Filed: May 4, 2015

(65) Prior Publication Data

US 2015/0234504 A1 Aug. 20, 2015

Related U.S. Application Data

(63) Continuation of application No. 13/048,138, filed on Mar. 15, 2011, now Pat. No. 9,024,887.

(30) Foreign Application Priority Data

Mar. 31, 2010 (KR) ........................ 10-2010-0029017

(51) Int. Cl.
*G06F 3/041* (2006.01)
*G06F 3/047* (2006.01)
*G09G 5/00* (2006.01)

(52) U.S. Cl.
CPC ............ *G06F 3/047* (2013.01); *G06F 3/0418* (2013.01); *G09G 5/003* (2013.01); *G09G 2300/0404* (2013.01)

(58) Field of Classification Search
CPC .................. G06F 3/044; G06F 3/0412; G06F 2203/04103; G09G 2300/0408
See application file for complete search history.

(56) References Cited

U.S. PATENT DOCUMENTS

| | | | |
|---|---|---|---|
| 6,590,622 B1 | 7/2003 | Nakanishi et al. | |
| RE41,833 E | 10/2010 | Sawai et al. | |
| 2005/0052582 A1 | 3/2005 | Mai | |
| 2005/0134577 A1 | 6/2005 | Lin et al. | |
| 2005/0208709 A1* | 9/2005 | Imai | G06F 3/016 438/118 |
| 2007/0232726 A1 | 10/2007 | Choi | |
| 2008/0062147 A1* | 3/2008 | Hotelling | G02F 1/13338 345/174 |
| 2008/0297486 A1 | 12/2008 | Kim et al. | |
| 2009/0066670 A1 | 3/2009 | Hotelling et al. | |
| 2009/0135160 A1 | 5/2009 | Sun | |

(Continued)

FOREIGN PATENT DOCUMENTS

| CN | 1942853 A | 4/2007 |
|---|---|---|
| CN | 101470556 A | 7/2009 |

(Continued)

*Primary Examiner* — Ibrahim Khan
(74) *Attorney, Agent, or Firm* — Jefferson IP Law, LLP

(57) ABSTRACT

A touch screen panel is provided. The touch screen panel includes an Indium Tin Oxide (ITO) sensor glass layer, a window glass layer mounted above the ITO sensor glass layer by means of an Optical Clear Adhesive (OCA), a conductive layer disposed between a surface of the window glass layer and a surface of the ITO sensor glass layer that includes an electrode pattern, and a touch screen control unit mounted on one of the window glass layer surface and the ITO sensor glass layer surface on which the conductive layer is mounted.

8 Claims, 5 Drawing Sheets

(56) References Cited

U.S. PATENT DOCUMENTS

| | | |
|---|---|---|
| 2009/0167718 A1 | 7/2009 | Lee et al. |
| 2009/0231019 A1 | 9/2009 | Yeh |
| 2009/0324899 A1 | 12/2009 | Feinstein et al. |
| 2010/0159782 A1* | 6/2010 | Shin .................. G02F 1/13452 445/24 |
| 2010/0214247 A1* | 8/2010 | Tang .................. H03K 17/98 345/173 |
| 2011/0012842 A1 | 1/2011 | Lee et al. |
| 2011/0141051 A1 | 6/2011 | Ryu |
| 2013/0278559 A1 | 10/2013 | Lee et al. |
| 2014/0300578 A1 | 10/2014 | Hotelling |

FOREIGN PATENT DOCUMENTS

| | | |
|---|---|---|
| CN | 201352342 Y | 11/2009 |
| JP | 1-114923 A | 5/1989 |
| JP | 5-324203 A | 12/1993 |
| JP | 2009-157916 A | 7/2009 |
| WO | 2010/019004 A2 | 2/2010 |

\* cited by examiner

TOUCH SCREEN PANEL

PRIORITY

This application is a continuation application of a prior application Ser. No. 13/048,138, filed on Mar. 15, 2011, which claimed the benefit under 35 U.S.C. §119(a) of a Korean patent application filed in the Korean Intellectual Property Office on Mar. 31, 2010 and assigned Serial number 10-2010-0029017, the entire disclosure of which is hereby incorporated by reference.

BACKGROUND OF THE INVENTION

1. Field of the Invention

The present invention relates to a touch screen panel used as a data input/output means of an electrical device. More particularly, the present invention relates to a touch screen panel in which a control unit for touch screen control is directly mounted on a sensor surface to improve touch sensitivity as well as preventing a touch fault.

2. Description of the Related Art

A variety of electronic devices employ an input unit for data input and an output unit for data output. A key button unit or the like is a representative example of the input unit. A display unit including a Liquid Crystal Display (LCD) module is a representative example of the output unit.

A touch screen panel capable of performing data input/output at the same position has recently been launched to diversify a function of the electronic device while significantly reducing a volume of the electronic device. The touch screen panel has a transparent touch panel disposed above the LCD module to simultaneously perform data input and output. There are various types of touch panels, such as a resistive touch panel, a capacitive touch panel, an ultrasonic wave touch type panel, an optical (infrared) sensor type touch panel, an electromagnetic induction type touch panel, etc.

Among the aforementioned touch panels, the capacitive touch panel includes a window portion made of a dielectric material, a dielectric layer (e.g., an Indium Tin Oxide (ITO) film layer and an ITO glass layer) bonded below the window portion and made of a Polyethylene Terephthalate (PET) or glass material, a conductive material coating layer which is disposed above the dielectric layer and of which a portion for touch sensing is coated with a transparent conductive material such as ITO, and an Optical Clear Adhesive (OCA) for bonding the ITO layer and the window portion. The conductive material coating layer includes a silver paste electrode portion. A Flexible Printed Circuit (FPC) is electrically connected to the electrode portion. A control unit for touch screen control is mounted on the FPC. An end portion of the FPC on which the control unit is mounted is electronically connected to a main board of the device.

However, when the control unit for touch sensing is mounted on the FPC as described above, the control unit may experience a contact fault due to flexibility of the FPC. As a result, touch sensitivity deteriorates, which leads to deterioration in reliability of the device.

SUMMARY OF THE INVENTION

An aspect of the present invention is to address at least the above-mentioned problems and/or disadvantages and to provide at least the advantages described below. Accordingly, an aspect of the present invention is to provide a touch screen panel implemented to improve touch sensitivity by mounting a control unit on a relatively solid portion of the touch screen panel without additional expansion space.

Another aspect of the present invention is to provide a touch screen panel implemented to prevent a contact failure of a control unit by mounting the control unit on an Indium Tin Oxide (ITO) glass layer or a window glass layer which is a relatively solid component of the touch screen panel and thereby to improve reliability of a device.

In accordance with an aspect of the present invention, a touch screen panel is provided. The touch screen panel includes an ITO sensor glass layer, a window glass layer mounted above the ITO sensor glass layer by means of an Optical Clear Adhesive (OCA), a conductive layer disposed between a surface of the window glass layer and a surface of the ITO sensor glass layer that includes an electrode pattern, and a touch screen control unit mounted on one of the window glass layer surface and the ITO sensor glass layer surface on which the conductive layer is mounted.

In accordance with another aspect of the present invention, a touch screen panel is provided. The touch screen panel includes a window glass layer, a conductive layer mounted on a lower surface of the window glass layer that includes an electrode pattern, and a touch screen control unit mounted on the lower surface of the window glass layer.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, it should be noted that like reference numbers are used to depict the same or similar elements, features, and structures.

DETAILED DESCRIPTION OF EXEMPLARY EMBODIMENTS

Figure 1:
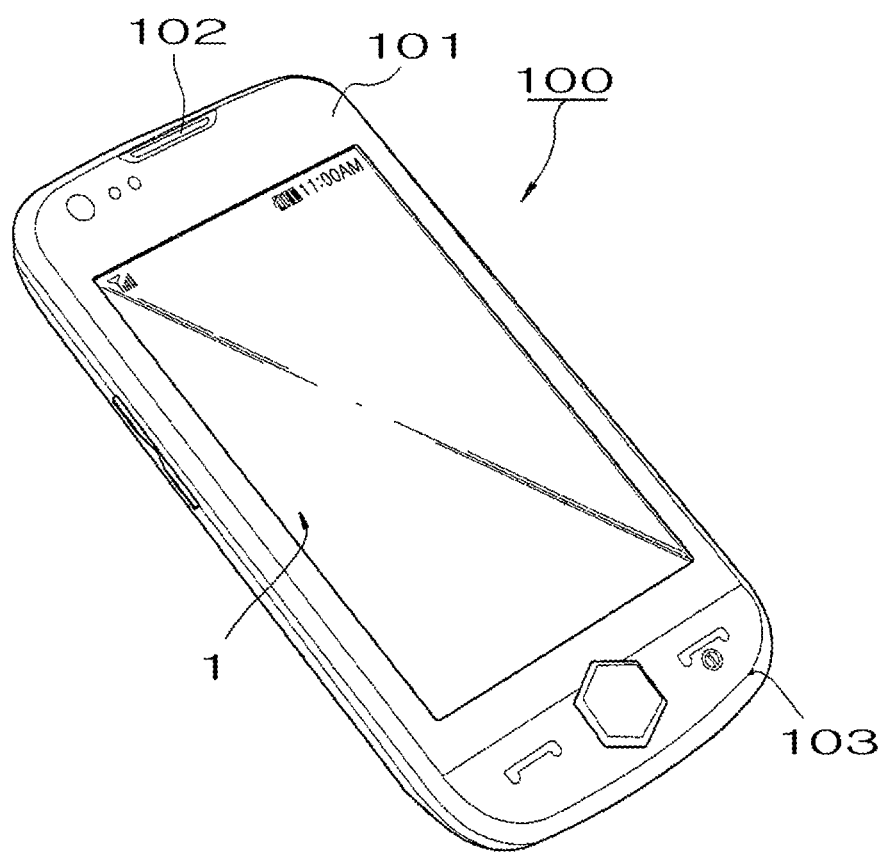
FIG. 1 is a perspective view of a portable terminal that employs a touch screen panel according to an exemplary embodiment of the present invention.

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions are omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention are provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

Although a portable terminal and a touch screen panel applied to the portable terminal are illustrated in the drawings, the present invention is not limited thereto. For example, the present invention can also apply to various types of electronic devices including the touch screen panel.

FIG. 1 is a perspective view of a portable terminal that employs a touch screen panel according to an exemplary embodiment of the present invention.

Referring to FIG. 1, a terminal 100 has a display unit 1 on a front surface 101 of the terminal 100. The display unit 1 supports data input/output functions simultaneously. A speaker 102 is disposed on a front surface 101 of the terminal 100 above the display unit 1. A microphone 103 is disposed on a front surface 101 of the terminal 100 below the display unit 1.

Figure 2:
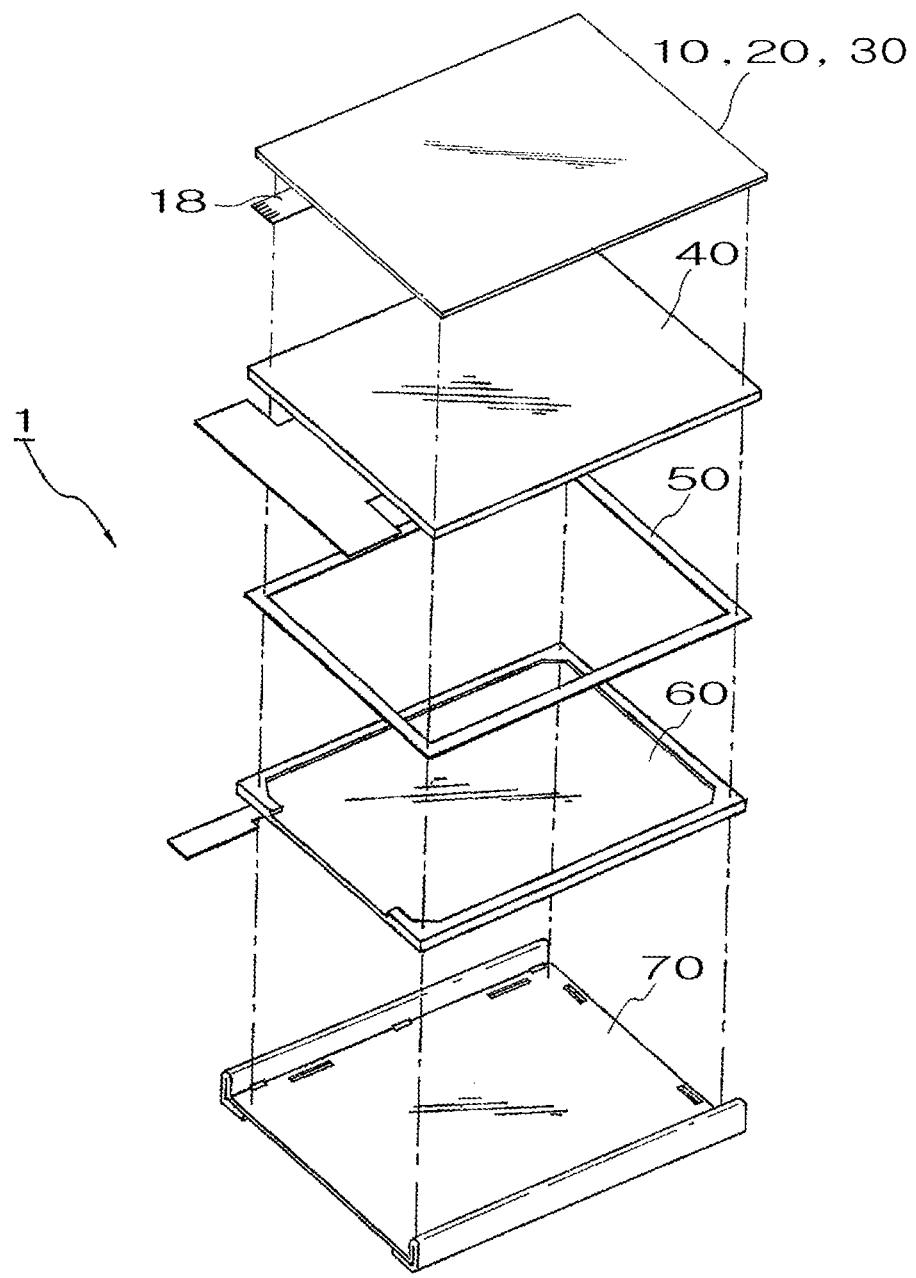
FIG. 2 is an exploded perspective view of the display unit of FIG. 1 according to an exemplary embodiment of the present invention.

FIG. 2 is an exploded perspective view of the display unit of FIG. 1 according to an exemplary embodiment of the present invention.

Referring to FIG. 2, the display unit 1 includes a reinforcement plate 70, a backlight unit 60, a double-sided tape 50, a Liquid Crystal Display (LCD) panel 40, and touch screen panels 10, 20, and 30, which are sequentially laminated on the reinforcement plate 70.

The reinforcement plate 70 may be made of a metal material such as Steel Use Stainless (SUS). The reinforcement plate 70 protects not only the backlight unit 60 but also other elements placed thereon, i.e., the LCD panel 40 and the touch screen panels 10, 20, and 30, and allows the display unit 1 to be used as one assembly.

A portion of a Flexible Printed Circuit (FPC) 18 protrudes to an outer side of the touch screen panels 10, 20, and 30. A connection member is formed on one end portion of the FPC 18 for electrical connection to a circuit board of a device. However, unlike the related art, a control unit for touch screen control (hereinafter, simply referred to as a control unit) is not connected via the FPC 18. The control unit of exemplary embodiments of the present invention may be disposed at an Indium Tin Oxide (ITO) glass layer or a window glass layer, i.e., a component of the touch panel. Hereinafter, additional details of the exemplary embodiments of the present invention will be described.

Figure 3:
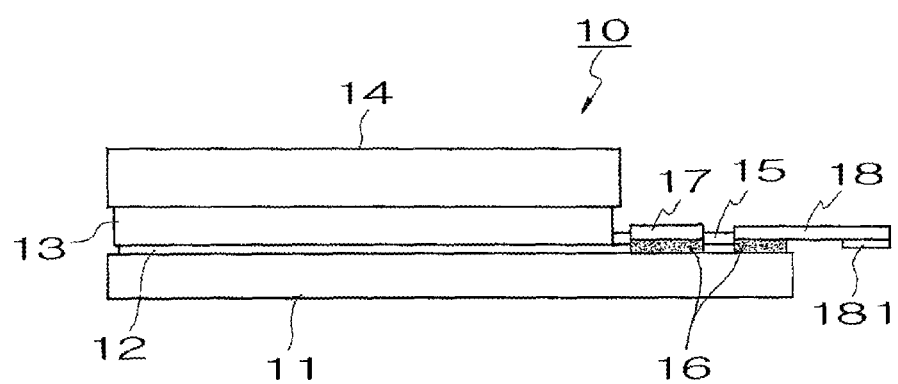
FIG. 3 is a cross-sectional view illustrating a structure of a touch screen panel according to an exemplary embodiment of the present invention.

FIG. 3 is a cross-sectional view illustrating a structure of a touch screen panel according to an exemplary embodiment of the present invention.

Referring to FIG. 3, a touch screen panel 10 includes an ITO sensor glass layer 11 disposed at a lowermost portion thereof A conductive layer 12 is coated on an upper surface of the ITO sensor glass layer 11. The conductive layer 12 is preferably made of a transparent conductive material including one of ITO, Indium Zinc Oxide (IZO), etc. An electrode pattern is formed on the conductive layer 12, and electrical connection may be possible through a silver paste electrode portion (not shown) in one or more ends of the conductive layer 12. A window glass layer 14 is laminated above the conductive layer 12 by using an Optical Clear Adhesive (OCA) 13 to construct the touch screen panel 10.

Although not shown, the conductive layer 12 may alternatively be coated on a lower surface of the window glass layer 14, which is laminated above the ITO sensor glass layer 11 by using the OCA 13.

According to an exemplary embodiment of the present invention, a touch control unit 17 is mounted on one of the surface of ITO sensor glass layer 11 or the surface of the window glass layer 14 that has the conductive layer 12 coated thereon. More specifically, the control unit 17 may be mounted on the surface of the ITO sensor glass layer 11 or the surface of window glass layer 14 by using Tape Automated Bonding (TAB). Preferably, the control unit 17 may be implemented with a Tape Carrier Package (TCP) on which a plurality of Integrated Circuits (ICs) is mounted. The TCP may be mounted above the surface of the ITO sensor glass layer 11 or below the surface of the window glass layer 14 in an electrical bonding manner. In this case, an Anisotropic Conductive Film (ACF) 16 is used as an adhesive member for providing bonding between electrodes of the conductive layer 12.

An FPC 18 which protrudes with a specific length by using the ACF 16 and which is used for electrical connection to a circuit board of the device may be mounted on the one of the surface of the ITO sensor glass layer 11 and the surface of the window glass layer 14 on which the control unit 17 is mounted. A connection member 181 is formed at one end portion of the FPC 18 to provide electrical connection with the device. In addition, an oxidation protection coating layer 15 may be laminated on an exposed upper portion of the conductive layer 12 to protect the conductive layer 12.

While certain elements of touch screen panel 10 have been shown in FIG. 3 and described herein, the touch screen panel 10 is not limited thereto and may include other elements that are not shown in FIG. 3 or described herein for conciseness in explanation.

Figure 4:
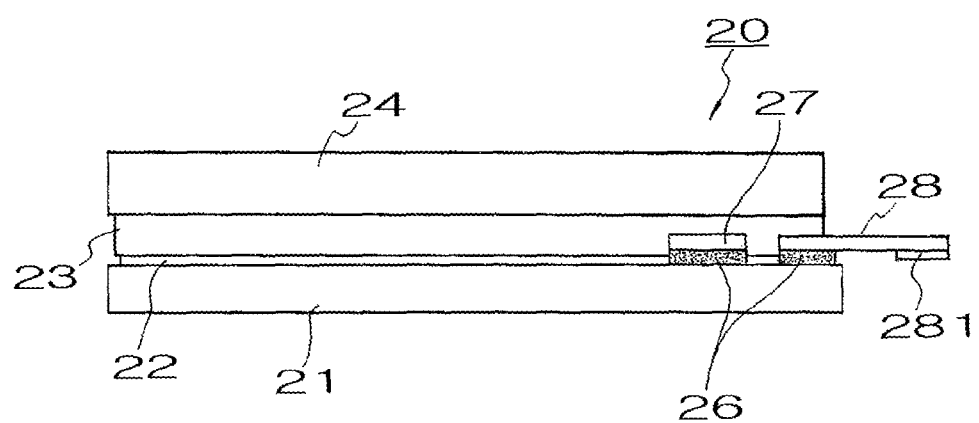
FIG. 4 is a cross-sectional view illustrating a structure of a touch screen panel according to another exemplary embodiment of the present invention.

FIG. 4 is a cross-sectional view illustrating a structure of a touch screen panel according to another exemplary embodiment of the present invention.

Referring to FIG. 4, a touch screen panel 20 includes an ITO sensor glass layer 21 disposed at a lowermost portion thereof. A conductive layer 22 is coated on an upper surface of the ITO sensor glass layer 21. The conductive layer 22 is preferably made of a transparent conductive material including one of ITO, IZO etc. An electrode pattern is formed on the conductive layer 22, and electrical connection may be possible through a silver paste electrode portion (not shown) in one or more ends of the conductive layer 22. A window glass layer 24 is laminated above the conductive layer 22 by using an OCA 23 to construct the touch screen panel 20.

Although not shown, the conductive layer 22 may alternatively be coated on a lower surface of the window glass layer 24, which is laminated above the ITO sensor glass layer 21 by using the OCA 23.

According to an exemplary embodiment of the present invention, a control unit 27 and an FPC 28 are mounted on one of the surface of the ITO sensor glass layer 21 and the surface of the window glass layer 24 on which the conductive layer 22 is coated. The control unit 27 and the FPC 28 may be mounted on one of the surface of the ITO sensor glass layer 21 and the surface of the window glass layer 24 by using TAB. Preferably, the control unit 27 may be implemented with a TCP on which a plurality of ICs is mounted. The TCP may be mounted above the surface of the ITO sensor glass layer 21 or below the surface of the window glass layer 24 in an electrical bonding manner. In this case, an ACF 26 is used as an adhesive member for providing bonding between electrodes of the conductive layer 22.

The FPC 28 protrudes with a specific length by using the ACF 26 and is used for electrical connection to a circuit board of the device. A connection member 181 is formed at one end portion of the FPC 28 to provide electrical connection with the device.

As is shown in FIG. 4, an oxidation protection coating layer is not necessary since a bonding portion of the control unit 27 and the FPC 28 can be laminated such that the bonding portion is covered by an OCA 23 and a window glass layer 24.

The aforementioned constitutional elements perform the same function even if they are indicated by different numeral references. While certain elements of touch screen panel 20 have been shown in FIG. 4 and described herein, the touch screen panel 20 is not limited thereto and may include other elements that are not shown in FIG. 4 or described herein for conciseness in explanation.

Figure 5:
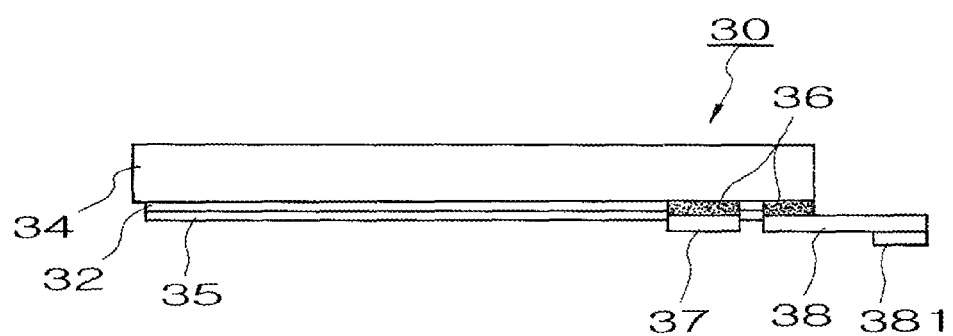
FIG. 5 is a cross-sectional view illustrating a structure of a touch screen panel according to still another exemplary embodiment of the present invention.

FIG. 5 is a cross-sectional view illustrating a structure of a touch screen panel according to another exemplary embodiment of the present invention.

Referring to FIG. 5, a touch screen panel 30 includes a conductive layer 32 that is laminated below a window glass layer 34. The conductive layer 32 is preferably made of a transparent conductive material including one of ITO, IZO, etc. An electrode pattern is formed on the conductive layer 32, and electrical connection may be possible through a silver paste electrode portion (not shown) in one or more ends of the conductive layer 32. In this case, an additional ITO film layer is unnecessary. In addition, in this case, a control unit 37 and an FPC 38 may be mounted on the lower surface of the window glass layer 34. The control unit 37 and the FPC 38 may be mounted on the lower surface of the window glass layer 34 by using TAB. Preferably, the control unit 37 may be implemented with a TCP on which a plurality of ICs is mounted. The TCP may be mounted on the lower surface of the window glass layer 34 in an electrical bonding manner. In this case, an ACF 36 is used as an adhesive member for providing bonding between electrodes of the conductive layer 32. The FPC 38 protrudes with a specific length by using the ACF 36 and is used for electrical connection to a circuit board of the device. A connection member 381 is formed at one end portion of the FPC 38 to provide electrical connection with the device. In addition, an oxidation protection coating layer 35 may be laminated on an exposed lower portion of the conductive layer 32 to protect the conductive layer 32.

The aforementioned constitutional elements perform the same function even if they are indicated by different numeral references. While certain elements of touch screen panel 30 have been shown in FIG. 5 and described herein, the touch screen panel 30 is not limited thereto and may include other elements that are not shown in FIG. 5 or described herein for conciseness in explanation.

According to exemplary embodiments of the present invention, a touch screen panel has a control unit mounted on a relatively solid glass layer of the touch screen panel. Therefore, touch sensitivity is improved by preventing a contact failure of the control unit due to bending or the like, thereby contributing to the resiliency and the reliability of a device.

While the present invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A touch screen panel comprising:
   a window glass layer;
   a conductive layer laminated below the window glass layer, the conductive layer including an electrode pattern configured to sense a touch;
   a touch screen control unit mounted directly to a lower surface of the window glass layer by an adhesive layer; and
   a Flexible Printed Circuit (FPC) mounted directly to a lower surface of the window glass layer by an adhesive layer and protruding from an end portion of the conductive layer, the FPC including a connection member on an end portion thereof protruding from the end portion of the conductive layer, the connection member electrically connected to a circuit board,
   wherein the touch screen control unit is a control unit for controlling a touch screen.

2. The touch screen panel of claim 1, wherein the touch screen control unit is implemented with a Tape Carrier Package (TCP) that includes a plurality of integrated circuits.

3. The touch screen panel of claim 2, wherein the TCP is bonded with an Anisotropic Conductive Film (ACF) by using Tape Automated Bonding (TAB).

4. The touch screen panel of claim 2, wherein the FPC is bonded to the end portion of the conductive layer by using an Anisotropic Conductive Film (ACF).

5. The touch screen panel of claim 1, wherein the touch screen panel does not include an additional Indium Tin Oxide (ITO) layer.

6. The touch screen panel of claim 1, wherein an oxidation protection coating layer is coated on an exposed portion of the conductive layer.

7. The touch screen panel of claim 1, wherein the conductive layer is comprised of a transparent conductive material.

8. The touch screen panel of claim 1, wherein the electrode pattern comprises a silver paste electrode portion arranged at one end of the conductive layer and connected to the FPC.

* * * * *